No. 702,582. Patented June 17, 1902.
J. W. NEILL & J. H. BURFEIND.
PROCESS OF RECOVERING METALS FROM ORES.
(Application filed Feb. 6, 1901.)
(No Model.) 2 Sheets—Sheet 1.
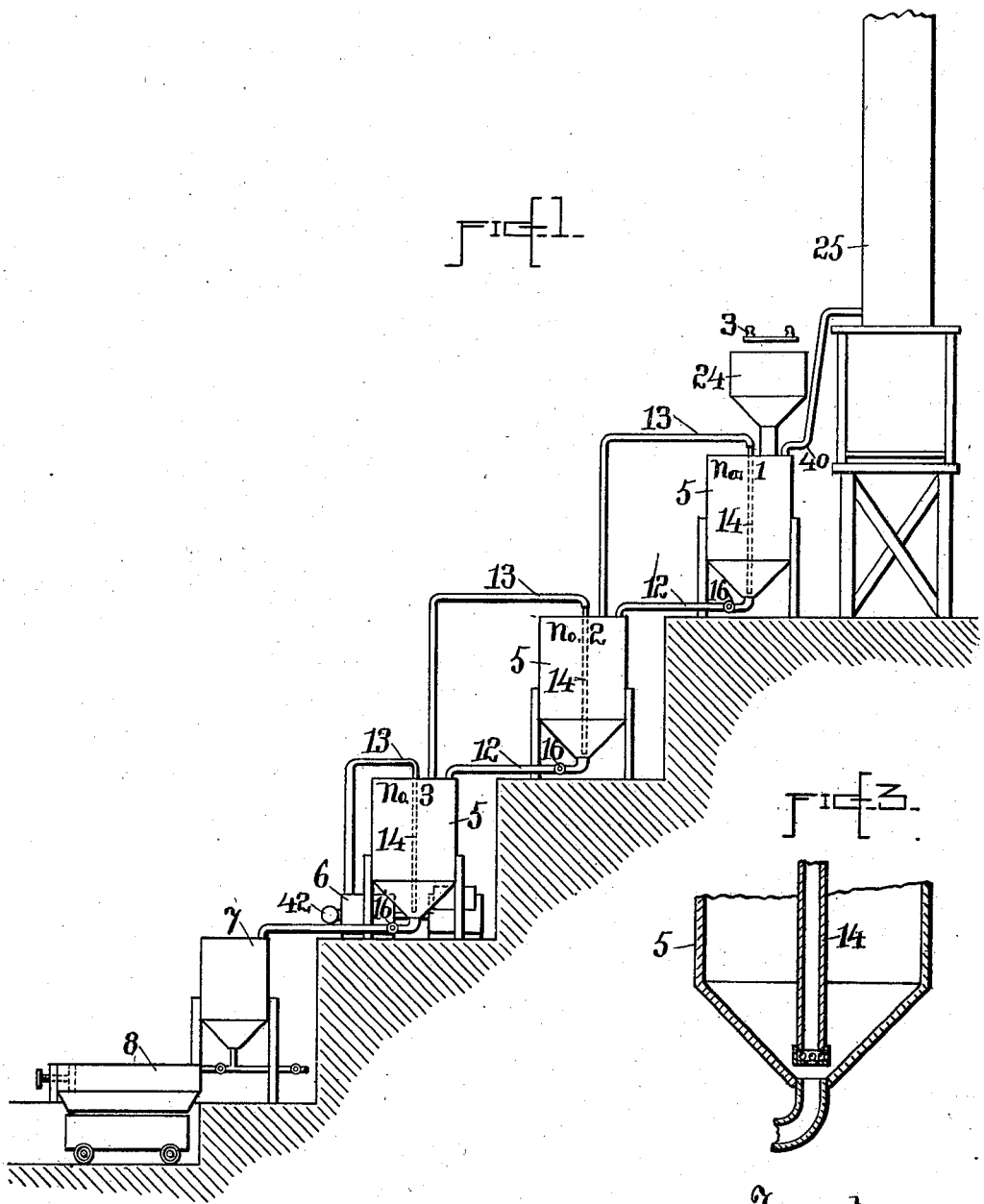
Witnesses:
Otto Greenberg
Ethel L. Lawler
Inventors
James W. Neill
Joachim H. Burfeind
By
Townsend
Attorney

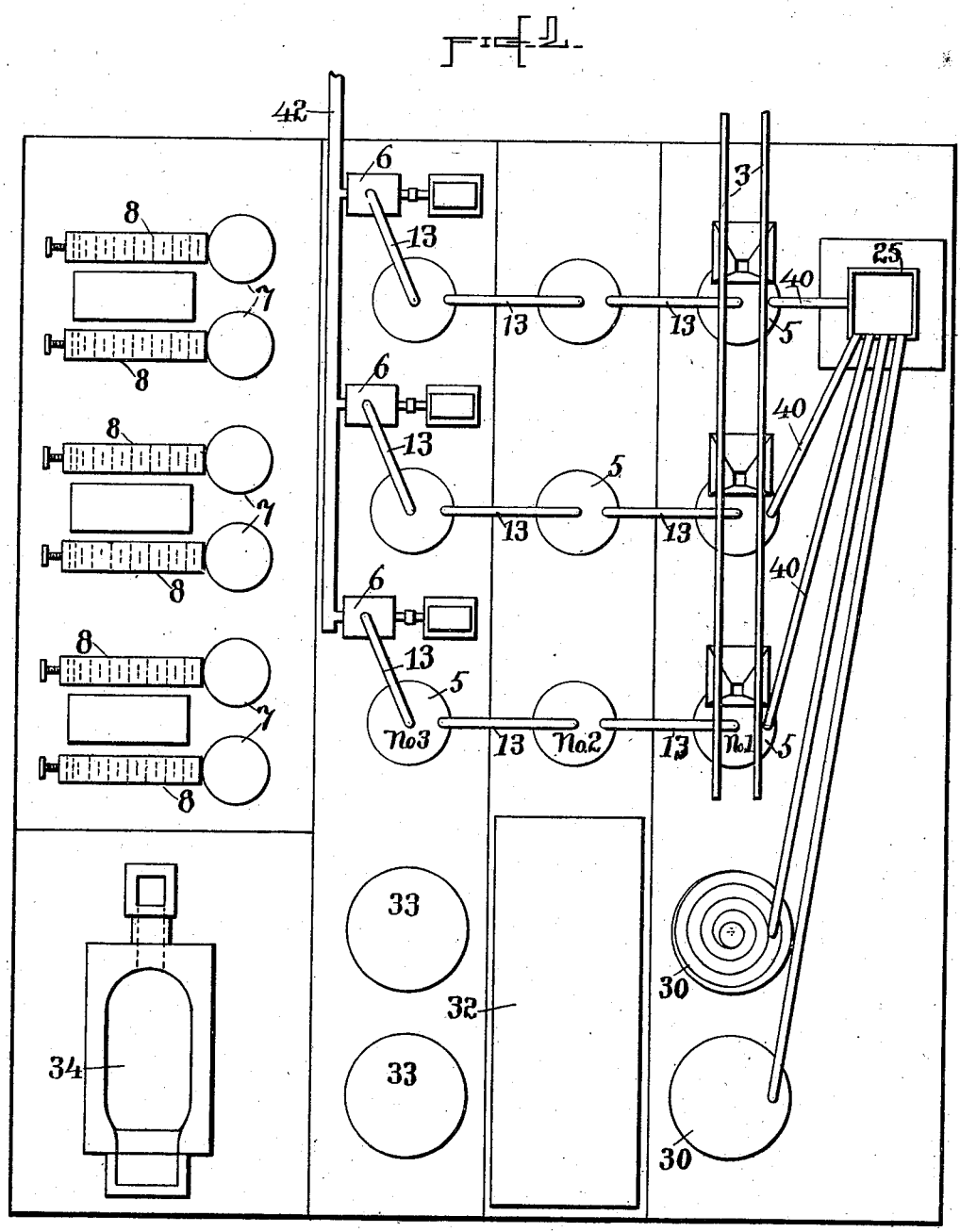

UNITED STATES PATENT OFFICE.

JAMES W. NEILL AND JOACHIM H. BURFEIND, OF SALT LAKE CITY, UTAH.

PROCESS OF RECOVERING METALS FROM ORES.

SPECIFICATION forming part of Letters Patent No. 702,582, dated June 17, 1902.

Application filed February 6, 1901. Serial No. 46,172. (No specimens.)

*To all whom it may concern:*

Be it known that we, JAMES W. NEILL and JOACHIM H. BURFEIND, citizens of the United States, and residents of Salt Lake City, in the county of Salt Lake and State of Utah, have invented a certain new and useful Process of Recovering Metals from Ores, of which the following is a specification.

Our invention relates, generally speaking, to those metallurgical operations wherein a mass of pulp in a suitable liquid-containing tank or receptacle is subjected to the action of any desired chemical agent or reagent for the purpose of changing its chemical constitution—as, for instance, in those processes of recovering metals from their ores wherein a solvent is used to dissolve out the metal by a leaching action.

Our invention is more particularly designed for use in those operations wherein a stream or streams of gas under pressure are employed to agitate the pulp, said gas being formed in whole or in part of the agent or reagent useful in the dissolving, treating, oxidizing, or other chemical processes to be performed, although in some cases the gas might be one which would be inert, in which case the solution or mixture would embody all of the chemical agents active in the process, and the gas would merely serve as a substitute for the mechanical rotating stirring apparatus heretofore employed in the receptacle containing the crushed ore commingled with the proper liquid.

One of the useful applications of our invention is in the process of extracting copper from copper ores by the use of sulfurous-acid gas, as described in United States Letters Patent granted to James W. Neill May 29, 1900, No. 650,784, although, as will be readily understood by those skilled in the art, the invention might be used with other ores or other agents, the nature of the agent being adapted in each case to the nature of the ore or of the metal to be recovered.

In the subjoined specification it is to be understood that the term "ore" is used to include tailings, concentrates, slimes and ores roasted or not, or any metal-bearing material, while the term "pulp" is to be taken as embracing any mixture of material and liquid adapted to form the semifluid mass which can be readily agitated and circulated by the action of gas under pressure.

Our invention consists, substantially, in agitating the charge of ore contained in the receptacle by means of a stream or streams of gas forced into the same to keep the pulp in a constant state of agitation and to secure a complete exposure of the material to the action of the chemical agents used in the process, recovering in any way the metal from the solution after the action has been carried on to the proper point and returning the gas or gases released by the recovering process for use in agitating fresh charges of ore.

In carrying out this invention it is obvious that the particular way of recovering the metal from the solution is immaterial, though we prefer to employ, particularly when the process is applied to the recovery of copper from its ores, a precipitation process in which the liquid-bearing solution is obtained by filtration of the pulp and is heated to drive off the gas used as the agent in the preliminary operation.

In applying our process to the process of the prior patent referred to the gas used would originally consist, preferably, in whole or in part of sulfurous-acid gas. As will be hereinafter described, however, it is desirable to use a gas obtained either from the burning of pyrites or native sulfur, in which case from three to five per cent. of the gas would naturally be sulfurous-acid gas. In this case the remaining volume of the gases serves the mechanical function of keeping the pulp in the tank in a state of agitation for the purpose already described and for other purposes to be hereinafter mentioned.

Another part of our invention consists in subjecting the ore to successive operations in a series or range of tanks or vats through which the gas used in the treatment of the ore is forced in succession, the series beginning with that one of the vats in which the ore is subjected to the final operation.

Our invention consists, further, in the process hereinafter described and then specified in the claims.

In the accompanying drawings, Figure 1 shows an ideal vertical section of a plant for carrying out our invention. Fig. 2 is a general plan of the same in outline, showing the plant extended to embody a number of ranges or series of construction of the gas-outlet of the pipe which delivers the gas into the tank.

We will first describe in general the construction of the tank in which the operation is to be conducted. The form of this tank is immaterial; but it is preferably made round, and its bottom is conical and slopes at an angle of forty-five degrees, more or less, to the center, at which point a discharge-opening is provided. In the drawings the several tanks are indicated by the numeral 5. Assuming that the ore is subjected to three successive operations, three such tanks are employed, and the pulp is delivered from one tank to the other in any suitable way—as, for instance, by gravity, which is the method shown in the drawings, where the tanks are represented as arranged at different levels— and the delivery-pipe (marked 12) passes the pulp from the bottom of one tank to the next lower tank. The tanks are covered at the top, preferably, so as to permit the gas used in the lower tank to be collected in the top thereof and passed therefrom by a pipe 13 to the next tank of the series. The tank is built either of wood or of iron and the iron either lined with wood or with lead or with other material or merely painted with some proper acid or solution resisting paint, according to circumstances. The connections 13 may be made by rubber hose attached to proper nipples. Entering the tank, preferably at the top, is a gas-delivery pipe 14, the outlet 15 of which is arranged near the apex of the conical bottom, as shown, so as to deliver a stream or streams of the gas employed at said point and to thereby secure an agitation of the pulp from the bottom and produce the action hereinafter described. It is preferable to construct this part of the apparatus so that it shall deliver the gas downwardly, since in this way we avoid in a large measure the danger of clogging resulting from shutting down the air-supply, and which would be liable to occur if the opening were arranged to deliver the gas or air upwardly.

The gas-outlet may consist of a cup in the center of which a hole of small diameter is bored and with a number of other holes around the edge to give egress to the gas in small streams, so that the gas will enter the tank broken up and in better condition to be absorbed. The hole in the bottom of the outlet throws a stream of gas into the discharge-opening and keeps this clear of sand, while the other holes around the edge throw their stream of gas against the sloping sides of the tank and keep the entire contents thereof in a constant whirl, the stream of pulp rising in the middle descending along the outside, where it falls on the sloping sides only again to meet the stream of gas. The form of this outlet, however, may be obviously very much varied. At each delivery-outlet a suitable controlling cock or valve 16 is employed.

The gas supplied to the pipe 14 is furnished under pressure by any suitable means. Said pipe may enter in any other way; but it is preferable to arrange it as shown, since it thereby affords little obstruction to the movement of the pulp or to the exit thereof from the tank.

At the top of the drawings is indicated at 24 an ore-hopper, above which is a narrow-gage track 3, which leads to the ore-bin, said hopper being adapted to receive the ore which has been first crushed to the necessary degree of fineness. From the car the ore is dumped into the hopper and from this passed into the leaching-tank, which has been previously charged with water containing some sulfurous acid, two tons of water being preferably used to one ton of the ore. This water may be obtained from the last washing of previous charges and from the tower 25, which may be placed at the end of the stream to absorb the last traces of the $SO_2$ gases or to collect gases obtained in any other way.

Other parts of the apparatus shown and employed in the process will be mentioned in connection with the operation, which will be described as carried on in connection with a copper ore to be leached in the tank by sulfurous acid.

In carrying out the leaching operation the top tank (No. 1 leaching-tank) is first filled with water or with the leaching fluid, according to circumstances. The gas or air which has been passed from the air-compressor 6, suitably located on one of the lower platforms, is kept continuously passing in series through the tanks, passing first from the top downward through the pipe in No. 3 leaching-tank, where it escapes through the hole in the bottom of said pipe, and owing to the pressure at which it is forced into this tank it agitates the contents of the tank, including the leaching solution or water in which the ore-pulp is contained. The gas or air escapes from the solution at the top of the No. 3 tank, passes similarly through the escape-pipe from this tank into the centrally-located stirring-pipe of the second leach-tank, where it again stirs the solution or ore-pulp. It is again released, passes through the pipe, and again through the centrally-located pipe into No. 1 leaching-tank, where it again acts as a stirring agent. The gas or air passes from this No. 1 tank either into the open air, or in cases where the gas may be the reagent to be used in the solution of the metals of the ore-pulp, and therefore any waste from the escape of this gas must be avoided, this gas is passed from the No. 1 leach-tank into and through a suitable wooden or other tower 25, where it is met by a stream of descending water and the gas absorbed, to be used again in the process. It will be seen, therefore, that the one compressor forcing the gas through the various connecting-pipes, in at the bottom and out of the top of each succeeding tank, stirs all the tanks in each unit and that this is the only mechanical stirring necessary. This is a great improvement over the present methods of agitating solutions in flat-bottom tanks by means of stirring apparatus consisting of a central revoluble shaft, to which are attached suitable wings or arms. By this older method should any accident occur by which the stirring ceases the ore-pulp immediately settles from the fluid in which it has been suspended, and unless the stirring-arms are promptly withdrawn they become embedded in the sand, and the entire contents of the tank must be dug out, with attendant loss of time and manual labor. By our improved method if the compressor stops and the sands settle to to the bottom of the conical tank no such harm is done. So soon as the gas is again forced through the central stirring-pipe it penetrates through the sand and immediately commences to bubble through and gradually forces the entire matter again into suspension, as it was before the interruption. In carrying out the leaching or treating operation we preferably operate two or more tanks, preferably situated, as shown, one above the other, so that the solution and pulp from the upper may flow by gravity into the next lower tank, and we preferably perform the leaching or treating operation in successive stages, finishing the operation in the lowest tank, (marked No. 3 leaching-tank,) where if the gas used in the operation contains the leaching agent—for instance, sulfurous acid—this gas is in its strongest condition, and therefore in best condition to completely dissolve all the metals or materials to be extracted from the ore-pulp. The escaping gas from the lowest tank passing through each of the other tanks successively is successively reduced in its strength, and thus the aforesaid gas or other agent is used in the most economical manner possible. Should the gas contain no solvent, but be merely air, it is still of use as an oxidizing agent as well as a stirring agent, which in many leaching methods is desirable, economical, and of great commercial advantage. So soon as small sample extract by simple methods from the lowest tank shows the pulp contained in this tank to be barren of the material to be extracted then this lowest tank may be emptied by opening the valve in the discharge connection, and the pulp and solution flows at once into suitable settling-vats or into pressure-tanks 7, from which it is again forced through filter-presses 8, or in any other well-known mechanical way pulp and solution are separated. The barren pulp is thrown away as worthless, and the solution containing the extracted metal may be further treated, as may be most economical and suitable or as more fully hereinafter set forth. So soon as the lowest leach-tank is emptied its discharge-valve is closed and the discharge-valve of No. 2 tank thereupon opened. This permits the discharge of the contents of the No. 2 tank into the No. 3 tank, and so soon as No. 2 is emptied No. 1 tank is similarly discharged into No. 2 tank, whereupon No. 1 tank is promptly charged with a fresh amount of water or diluted solution, as may be desirable, and the crushed ore thereupon introduced from the ore-hopper. Thus the ore to be leached is successively treated in each tank, and the time of leaching and stirring is thus to be multiplied by the number of tanks and the length of time in each tank. Thus if an ore has to be allowed to remain in the No. 3 tank a period of three hours and there are three tanks in the unit the ore will be subjected to a total stirring agitation and exposure to the influence of the stirring-gas for a period of nine hours. The pressure at which the gas must be delivered through the stirring-pipe into the lowest leach-tank must necessarily be sufficient to overcome hydrostatic pressure of the columns of water contained in the several tanks composing the unit. Thus if there are three tanks in the unit and each tank contains water or solution to the depth of ten feet, or a total of fifty feet hydrostatic pressure, the gas will have to be forced into the first tank at a pressure approximating fifteen pounds to the square inch, and the lowest tank must be able to withstand such pressure. The next or No. 2 tank will only be subjected to a hydrostatic pressure of twenty feet or approximately ten pounds and the No. 1 tank correspondingly approximately five pounds.

The advantages which we claim for this system are therefore—

First. A much cheaper installation, as the tanks do not have to be equipped with mechanical rotating stirring apparatus, and the necessary shafting, belting, and pulleys to drive the same are done away with.

Second. Freedom from disastrous stoppages caused by slight cessation of the stirring mechanism.

Third. More complete agitation, and therefore more complete exposure of the material to be leached to the action of the solution or gas, or both.

Fourth. Successive exposure in successive charges to the solvent action of gas of successively-increasing strength. This is an important feature of our process as applied either to the recovery of copper or of other metal from its ore. Where, as is usual, the gangue or pulp treated contains ingredients some of which are easily soluble or susceptible to the action of the reagent employed, but others are not so easily soluble, the latter will remain longer in the gangue or pulp and will require for their recovery either a long time in a weak solution or solvent or a short time only with a strong solvent. By our improved operation the more refractory parts of the ore or pulp only are subjected to a longer action, but are finally exposed to the action of the strongest solution. This improved operation enables us to treat ores in a very much shorter time than is usually required.

Fifth. Extremely simple mechanical handling and delivery of materials without manual labor.

In completing the operation of extracting the copper the liquid obtained from the filterpresses may be carried to the precititation-tanks 30, (indicated in plan in Fig. 2,) where the liquid is heated in any suitable way known in the art, and the excess of $SO_2$ gases released in these heating-tanks may be carried to the tower 25 to be there absorbed by the water, or be carried directly to the compressor which delivers it at once again into the tanks containing the ore charges. Ordinarily it will be preferable to deliver the released gas direct to the compressor, as it is released in the heating-tanks, practically speaking, as pure $SO_2$ gas mixed, perhaps, with a little steam, and this pure gas enriches the gas coming from the burners or roasting-furnaces to such an extent that its action is much more rapid, and whereby a great deal of time is saved.

As already stated, we may obtain the $SO_2$ gas from the roasting of the ore. In that case we draw the gas from the sulfur-burners or the roasting-furnaces through water in a washer for the purpose of freeing it from any impurities, cooling, and condensing it. If the gas is obtained from roasting-furnaces or blast-furnaces, the flue-dust and volatilized metals will also be effectually regained in the washer. After the gas is thus washed, condensed, and cooled it is taken by the compressor and forced into the ore charge, and at the point where the compressor takes the washer gas we also conduct the released gas from the heating-tank, which, as stated, being nearly pure $SO_2$, enriches the gas from the burners or furnaces, which is entirely novel and new and of great importance, as already mentioned. The stronger the gas the less time will be required to dissolve the copper or other metals soluble in that menstrum. Thus when using a strong gas the ore to be treated may be a great deal coarser than it should be if only a weak gas can be had.

32 is a drying-floor adapted to receive the copper precipitates obtained from the tanks 30, and 33 indicates tanks to be employed for the clean-up of the solution.

34 indicates in plan a furnace which may be used in any of the final operations.

In the plan we show three series of leaching-tanks, all adapted to receive their ore from the same track and the final tank of each series connected by waste gas-pipe 40 with the tower 25.

The compressors which would be employed in the process are indicated in outline at 41, and the pipe which brings the $SO_2$ gas from the wash-tanks to the compressors is indicated by the numeral 42.

What we claim as our invention is—

1. The herein-described improvement in leaching copper ores, consisting in forcing sulfurous-acid gas through a charge of pulp to agitate the same mechanically and thereby assist in the leaching action, separating the solution from the ore, recovering the metal from such solution, thereby releasing the gas and returning the gas released by such operation for use in agitating and dissolving the metal from fresh charges of ore.

2. The herein-described improvement in leaching copper ores consisting in forcing sulfurous-acid gas through a charge of pulp to agitate the same mechanically and thereby assist in the leaching action, separating the solution from the ore, precipitating the metal from the solution thereby releasing the gas and returning the sulfurous-acid gas released by the precipitating operation for use in agitating and dissolving metal from fresh charges of ore.

3. The herein-described improvement in leaching copper ores consisting in subjecting the ore-pulp to successive leaching operations in a series of tanks and forcing through the tanks in succession a gas containing the solvent agent, beginning with that tank in which the ore is subjected to the final leaching operation, as and for the purpose described.

4. The herein-described improvement in treating ores in metallurgical operations consisting in subjecting the ore to successive operations in a series of tanks and forcing through the tanks in succession a gas containing the treating agent beginning with that tank in which the ore is subjected to the final operation and ending with that tank in which the ore is subjected to the initial treatment, as and for the purpose described.

5. The herein-described improvement in treating ores, consisting in forcing sulfurous-acid gas through a charge of pulp to agitate the same mechanically and to assist in the leaching action, then filtering the pulp to obtain the metal-bearing solution, precipitating the metal from such solution thereby releasing the gas and returning the sulfurous-acid gas released by the precipitating process for use in agitating and dissolving metals from fresh charges of ore.

6. The herein-described improvement in treating copper or other ores, consisting in agitating a charge of pulp containing the ore by gas from roasting-furnaces charged with material suitable for producing sulfurous-acid gas, separating the resultant solution, precipitating the metal from the solution thereby releasing gas and employing the sulfurous-acid gas released by the precipitating process to enrich the gas derived from the furnace and used in leaching a charge of ore.

Signed at New York, in the county of New York and State of New York, this 19th day of January, A. D. 1901.

JAMES W. NEILL.

Witnesses:
 DELBERT H. DECKER,
 E. L. LAWLER.

Signed at Salt Lake City, in the county of Salt Lake and State of Utah, this 28th day of January, A. D. 1901.

JOACHIM H. BURFEIND.

Witnesses:
 J. B. THOMPSON,
 FRANK C. ROCKER.